UNITED STATES PATENT OFFICE.

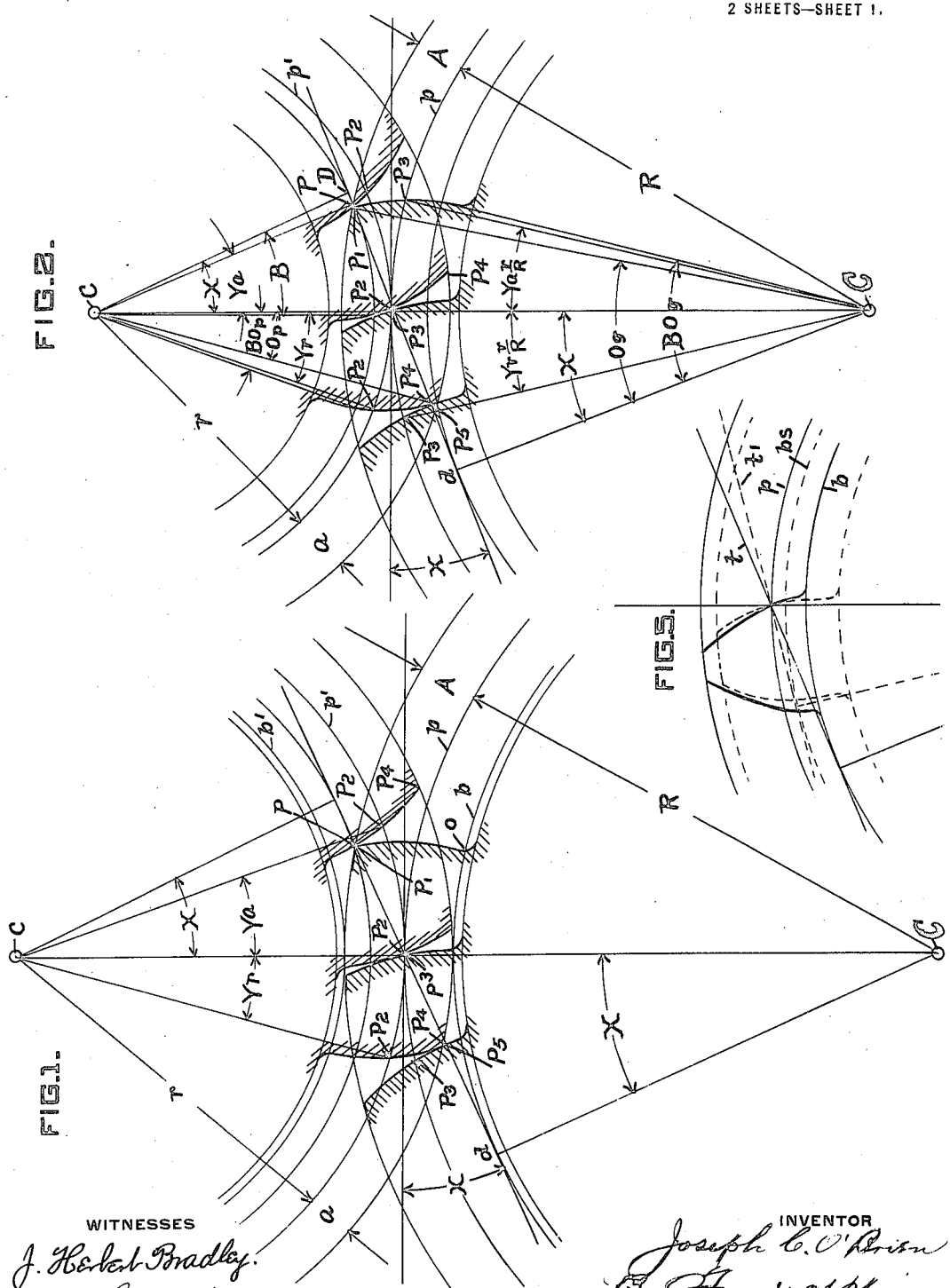

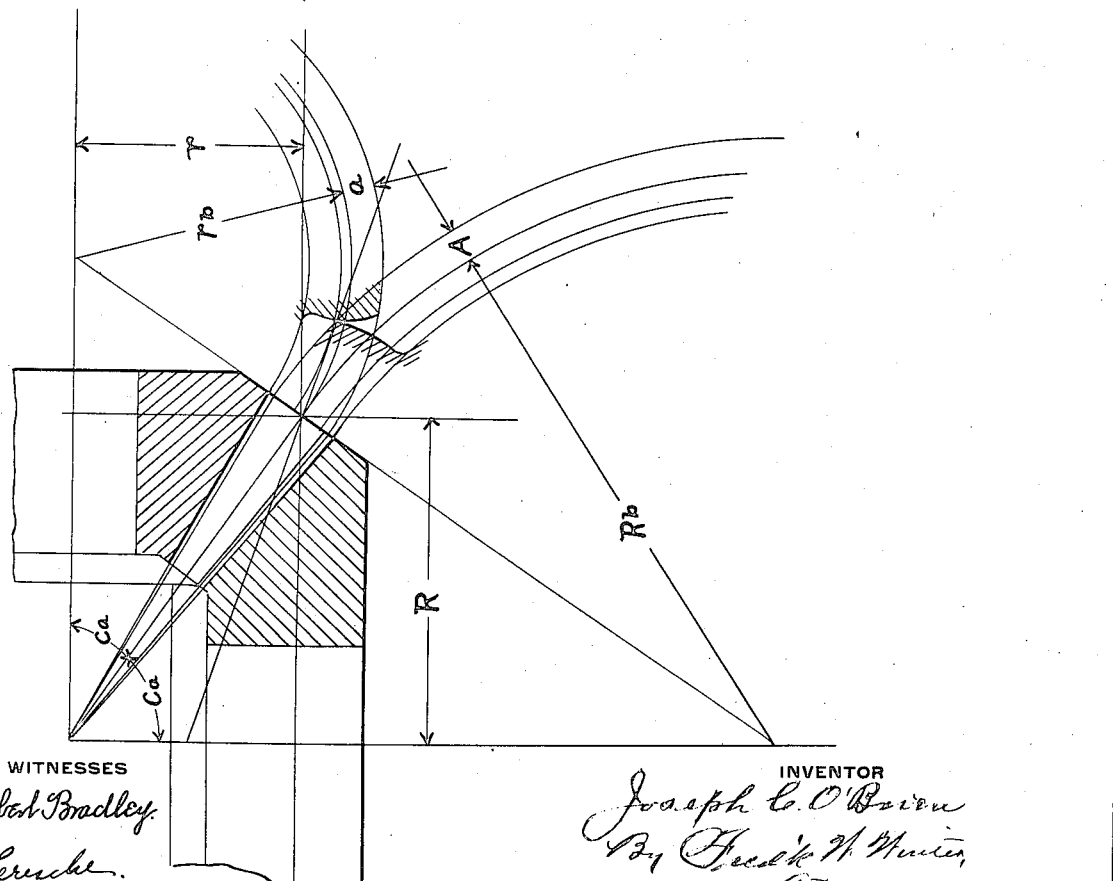

JOSEPH C. O'BRIEN, OF PITTSBURGH, PENNSYLVANIA, ASSIGNOR TO PITTSBURGH GEAR & MACHINE COMPANY, OF PITTSBURGH, PENNSYLVANIA, A CORPORATION OF PENNSYLVANIA.

INVOLUTE-TOOTHED GEAR.

1,412,889.  Specification of Letters Patent.  Patented Apr. 18, 1922.

Application filed August 5, 1918. Serial No. 248,383.

*To all whom it may concern:*

Be it known that I, JOSEPH C. O'BRIEN, a resident of Pittsburgh, in the county of Allegheny and State of Pennsylvania, have invented a new and useful Improvement in Involute-Toothed Gears, of which the following is a specification.

This invention relates to intermeshing involute toothed gears. The objects of the invention are to provide intermeshing gears having teeth so shaped that for any given size of gears and gear ratio the teeth thereof, as compared with the teeth of standard gears, are stronger, will wear less rapidly, will retain a closer approximation to their theoretical form after wear, will operate with less noise and vibration after they are worn, can be operated at higher speeds, and permit larger gear ratios to be used, but nevertheless are such that they can be manufactured on any of the standard commercial machines used to machine the teeth of gear wheels.

For the attainment of these objects, the invention consists in intermeshing gears so formed that the sliding element of the tooth action is reduced to an advisable minimum, preferably to what I term the critical point, that is, where the sliding and rolling actions increase at the same ratio; and in which the arcs of approach and recession are varied with the gear ratio in such a manner that the ratio of sliding to rolling action is equal at the beginning of the approach and the end of the recession.

The invention is applicable to any type of spur, helical or beveled gearing, and the form of the teeth for each different set of intermeshing gears is determined by a fixed rule or formula having for its factors the fixed factors of the particular gears being considered, namely, the pitch radii of the two gears (in the case of spur or helical gears, and in the case of beveled gears, the back cone radii of said gears), the distance between the centers of the two gears, and the angular velocity ratio thereof, the latter being the ratio between and being inversely proportional to the pitch diameters of the two gears.

In involute gearing as heretofore designed, the form of the teeth has been such that the amount of sliding movement relative to the rolling movement in the tooth action has been greater in the approach than in the recession, as a consequence of which the teeth wear rapidly, and after being worn very considerably from their theoretical form, become noisy and subject to vibration, are weakened, are limited in the speeds of their operation, and are also limited as to the gear ratio.

These objections are overcome by the present invention, by so forming the teeth, and particularly the addenda thereof, that the amount of sliding movement in the tooth action is reduced to an advisable minimum and the ratio of sliding movement to the rolling movement in the approach and in the recession are equal, whereby the several advantages above enumerated are attained.

In the accompanying drawings Fig. 1 illustrates diagrammatically the cycle of action of a pair of involute spur gear teeth; Fig. 2 illustrates more in detail the arcs of approach and recession of a pair of such teeth; Fig. 3 illustrates diagrammatically the back cone radii of a pair of beveled gears; Fig. 4 illustrates diagrammatically the generation of an involute curve; and Fig. 5 diagrammatically illustrates the form of the improved tooth relative to an ordinary involute tooth.

In Figs. 1 and 2 the center of the smaller gear or pinion (the driver) is at $c$, and that of the larger (or driven) gear is at $C$; the distance between the centers of the gears is the distance $c$—$C$; $b$ and $b'$ indicate the base circles of the gear and pinion, respectively; $p$ and $p'$ indicate the pitch circles of the gear and pinion respectively; $r$ indicates the pitch radius of the pinion, and $R$ the pitch radius of the gear, in the case of spur gears, while $rb$ (Fig. 3) indicate the back cone radius of the pinion and $Rb$ the back cone radius of the gear, in the case of beveled gears; $a$ is the addendum (to-wit, the radial distance from the pitch circle to the outside circle) of the teeth of the pinion or smaller gear, and $A$ the addendum of the teeth of the larger gear; $A$ plus $a$ is the working depth of tooth; $Ya$ is the arc of approach and $Yr$ the arc of recession; $x$ is the pressure angle, which is the angle of the line of pressure with respect to the common tangent to the pitch circles of the intermeshing gears, and is therefore a function of the distance $c$—$C$ and the angular velocity ratio, which as above stated is the ratio between, and is inversely proportional to the pitch diameters of the two gears; B is the angle whose arc is equal to the tangent of the pressure angle; $Og$ is the angle formed by a line normal to the pressure line and a line to the first point of contact; $Op$ is the like angle formed by a line normal to the pressure line and a line to the last point in the involute curve; $BOg$ is the angle formed by a line normal to the pressure line and a line radial to the origin of the involute curve, and is equal to the tangent of the angle $Og$ divided by the arc of one degree and $BOp$ is the angle $Op$ divided by the arc of one degree.

Referring to Figs. 1 and 2, the two teeth come in contact at the points P, P', and at the end of the arc of approach are in contact at the points $P^2$, $P^3$, so that during the arc of approach the length of the curves P, $P^2$, and P', $P^3$, come into action. The length of the shorter curve, to-wit, P, $P^2$, represents the amount of the rolling action that occurs, and the difference between the lengths of the two curves P, $P^2$, and P', $P^3$, represents the amount of sliding action that occurs. Similarly, during the arc of recession the curves $P^2$, $P^4$, and $P^3$, $P^5$, come into action and the length of the shorter one of the curves, to-wit, $P^3$, $P^5$, represents the amount of rolling action that occurs, and the difference between the lengths of these two curves represents the amount of sliding action that occurs. Now, it is evident that if the sliding element in this tooth is reduced to the permissible minimum, and if the sliding action in the approach and the recession are made equal, the teeth will wear much less rapidly and when worn will retain a closer approximation to their theoretical form, and the several advantages hereinbefore enumerated will be attained.

I have discovered that these objects can be attained when the teeth of the two intermeshing gears are so shaped that the addenda of the teeth of the pinion or smaller gear are equal to $$\left\{\left(\sqrt{\left(\frac{R}{R+2r}+1\right)^2+\cot^2 x}\right)\sin x - 1\right\}r$$

and the addenda of the teeth of the larger or driven gear are equal to $$\left\{\left(\sqrt{\left(\frac{r}{r+2R}+1\right)^2+\cot^2 x}\right)\sin x - 1\right\}R,$$

in which formulæ $r$ and R respectively represent, in the case of spur gears, the pitch radii of the smaller and larger gears, and in the case of beveled gears, the back cone radii of the larger and smaller gears. It is, of course, obvious that when the two gears are of equal size these two formulæ become the same.

Why this is so will now be explained.

From the geometry of Figs. 1 and 2 we have the following fundamental equations:

(1) $\quad \text{Tan } Og = \sqrt{\dfrac{(R+A)^2 - R^2 \cos^2 x}{R \cos x}}$ (2) $\quad \text{Tan } Op = \sqrt{\dfrac{(r+a)^2 - r^2 \cos^2 x}{r \cos x}}$ (3) $\quad Ya = \left(\dfrac{\tan Og - \tan x}{.01745}\right)\dfrac{R}{r}$ (4) $\quad Yr = \left(\dfrac{\tan Op - \tan x}{.01745}\right)$ Formulæ (1) and (2) are arrived at very simply, as follows:

Referring to Fig. 2 to the right-angle triangle $CdP$, since the side opposite the angle $Og$ is equal to the square root of the difference between the square of the hypothenuse and the square of the side adjacent, we have in the language of the assumed symbols $$\sqrt{(R+A)^2 - R^2 \cos^2 x}$$

and dividing this by the side adjacent (R cos $x$) we have the quantity given at the right hand of formula (1) as the natural tangent of the angle $Og$.

Similarly, taking the right-angle triangle $cDP4$ and proceeding in a similar manner, we arrive at the quantity on the right hand side of the formula (2) as the natural tangent of the angle $Op$.

Formulæ (3) and (4) are derived as follows:

The arc of approach $(Ya)$ may be defined as the angle through which a point on the pitch circle of the pinion (driver) moves while the point of contact between the tooth curves moves from the beginning of the mesh to the line of centers $C$—$c$, and since the angular motion transmitted is inversely proportional to the pitch radii of the gearing, we have $Ya\dfrac{r}{R}$ as the angular movement of the gear during the arc of approach. From the manner in which the tooth curve may be generated it is evident that $$Ya\frac{r}{R} = \frac{R \cos x \tan Og - R \cos x \tan x}{R \cos x .01745},$$

in which .01745 is the length of the arc of one degree with a one inch radius. Cancelling the common factor (R cos $x$) and multiplying both sides of the equation by $\dfrac{R}{r}$, we arrive at equation (3) as that of the arc of approach.

The arc of recession may be defined as the angle through which a point on the pitch circle of the pinion moves while the point of contact between the tooth curves moves from the line of centers C—c to the end of the mesh. From the manner in which the tooth curve may be generated it is evident that $$Yr = \frac{r \cos x \tan Op - r \cos x \tan x}{r \cos x \, .01745}$$

Cancelling the common factor ($r \cos x$) we arrive at formula (4) as that of the arc of recession.

With the new form of tooth the rate of increase of the rolling length to the rate of increase in sliding length is substantially the same during the arc of approach as during the arc of recession, as will now be explained.

An involute curve may be defined in simple language as the curve generated by any point on a cord or thread as it is unwound from any base curve. This is diagrammatically illustrated in Fig. 4, where $e$—$o$ represents an involute curve starting at the point of origin $o$ on the base circle $b$. From the manner in which the curve may be generated it is evident that the radius of curvature of any point in an involute is equal to the arc of the base circle between the origin of the involute curve and the center of curvature of the point considered. Therefore, if we represent the radius of the base circle by the symbol $R \cos x$, the arc of one degree to a one-inch radius as .01745, and the angle between the origin of the involute curve and the center $d$ of curvature of the last point in the involute curve by Y, we have $R \cos x \, .01745 \, Y$ as the radius of curvature of the point in the involute curve whose center of curvature lies Y degrees from the origin. In Fig. 4 the curve $e$—$f$ represents a circular arc of the same radius of curvature ($d$—$e$) as the last point in the involute curve $e$—$o$ and one-half the angle Y in length. Therefore, in terms of the symbols used we have $R \cos x \, .01745 \, Y$ times $$\frac{.01745 \, Y}{2}$$

or $$\frac{R \cos x \, .01745^2 Y^2}{2}$$

as the length of the circular arc $e$—$f$. Now, as the angle Y approaches zero the center of curvature $d$ approaches $o$, the last point on the involute curve $e$ approaches $o$, the end of the circular arc $f$ approaches $o$, and the length of both the involute curve and the circular arc approach zero as their limit. Since both the involute curve and the circular arc are functions of the variable angle Y and both approach the same limit at the same rate, they must, therefore, be equal to each other. Therefore, the length of any involute curve may be calculated from the following formula $$\left(\frac{R \cos x \, .01745^2}{2}\right) Y^2,$$

where R is the radius of the pitch circle, $x$ the pressure angle, and Y the angular distance between the origin of the curve and the center of curvature of the last point in the curve. The distance between any two points in an involute curve may be found by subtracting the length from the origin to the first point, from the length from the origin to the last point in the curve. The length of curve from the origin to the pitch circle of any pinion-tooth curve will equal $$\frac{r \cos x \, .01745^2 B^2}{2},$$

and the portion of the curve which does not come into action during an arc of approach $Ya$ will be $$\frac{r \cos x \, .01745^2}{2}(B - Ya)^2.$$

Therefore, the portion of the tooth curve that comes into action during an arc of approach $Ya$ will be the difference in these lengths, or $$\frac{r \cos x \, .01745^2}{2}[B^2 - (B^2 - 2BYa + Ya^2)],$$

or $$(5) \quad \frac{r \cos x \, .01745^2}{2} Ya^2 \left(\frac{2B}{Ya} - 1\right)$$

which is the total rolling length of curve for any assumed arc of approach ($Ya$).

As the angular motion transmitted is inversely proportional to the pitch radii, the mating gear, for an angular movement of $Ya$ degrees of the pinion (driver), will have an angular movement of $Ya \frac{r}{R}$ degrees. Therefore, the length of the gear tooth curve from the first point of contact to the origin of the curve will be $$\frac{R \cos x \, .01745}{2}\left(B + Ya \frac{r}{R}\right)^2,$$

or $$\frac{R \cos x \, .01745^2}{2}\left(B^2 + \frac{2BYar}{R} + \frac{Ya^2 r^2}{R^2}\right),$$

and as the portion of the curve below the pitch circle does not come into action during the approach, we may find the active length of curve by subtracting this length $$\frac{R \cos x \, .01745^2}{2} B^2$$

from the total length, in which case we have $$\frac{R \cos x \cdot .01745^2}{2}\left(\frac{2BYar}{R}+\frac{Ya^2r^2}{R^2}\right),$$

or (6) $\quad \dfrac{r \cos x \cdot .01745^2}{2} Ya^2 \left(\dfrac{2B}{Ya}+\dfrac{r}{R}\right)$ which is the length of gear tooth curve that comes into action during any assumed arc of approach $Ya$.

Subtracting the rolling length from the length of gear tooth curve that comes into action we have (6)–(5) $\dfrac{r \cos x \cdot .01745^2}{2}\left[\left(\dfrac{2B}{Ya}+\dfrac{r}{R}\right)-\left(\dfrac{2B}{Ya}-1\right)\right]$, or (7) $\quad \dfrac{r \cos x \cdot .01745^2}{2}\left(\dfrac{r}{R}+1\right),$ which is the total sliding length of curve for any assumed arc of approach $Ya$.

In a similar manner the following two formulæ can be demonstrated for the total rolling and the total sliding lengths respectively of tooth curve that come into action during an assumed arc of recession $Yr$:

(8) $\quad \left(\dfrac{r \cos x \cdot .01745^2}{2}\right) Yr^2 \left(\dfrac{2B}{Ya}-\dfrac{r}{R}\right)$ as the total rolling length, and (9) $\quad \left(\dfrac{r \cos x \cdot .01745^2}{2}\right) Yr^2 \left(1+\dfrac{r}{R}\right)$ as the total sliding length of the curve.

Now, if we take any two values of the arc of approach, as $Ya'$ and $Ya$, and let $Ya'$ minus $Ya$ equal $i$ (increment), we have $$\frac{r \cos x \cdot .01745^2}{2}(2B-2Ya-i)i$$

as the increment of the total rolling length corresponding to the increment $(i)$ of $Ya$, and $$\frac{r \cos x \cdot .01745^2}{2}\left(\frac{r}{R}+1\right)(2Ya+i)i$$

as the increment of the total sliding length corresponding to said increment $(i)$ of $Ya$. It is, therefore, evident that as the arc of approach increases the total rolling length of the curve increases at a diminishing rate between values of $Ya=0$ (Zero) and $Ya=B$ and the total sliding length increases at an increasing rate. The point at which the increment to the sliding length equals the increment to the rolling length is therefore a critical point or value of $Ya$, any values of $Ya$ above this point introduces into the action more sliding length than rolling length, and any value of $Ya$ below this point eliminates from the action more rolling length than sliding length. If, now, we make the increment to rolling length equal to the increment to sliding length, and solve for $Ya$, we have $$\frac{B}{\dfrac{r}{R}+2}$$

as the value of $Ya$ at the critical point.

In a like manner, if we take any two values of the arc of recession, as $Yr'$ and $Yr$ and let $Yr'$ minus $Yr$ equal $i$, we have $$\frac{r \cos x \cdot .01745^2}{2}\left(2B-\frac{2rYr}{R}-\frac{ri}{R}\right)i$$

as the increment to the rolling length corresponding to the increment $i$ of $Yr$, and $$\frac{r \cos x \cdot .01745^2}{2}\left(\frac{r}{R}+1\right)(2Yr+1)i$$

as the increment to the sliding length corresponding to the same increment $(i)$ of $Yr$. If, now, we make the increment to the rolling length equal to the increment to the sliding length and solve for $Yr$, we have $$\frac{B}{1+\dfrac{2r}{R}}$$

as the value of $Yr$ at the critical point. Substituting these critical values in the fundamental equation (3) we have $$\frac{B}{\dfrac{r}{R}+2}=\left(\frac{\tan Og-\tan x}{.01745}\right)\frac{R}{r}.$$

Multiplying both sides of the equation by $$\frac{.01745\, r}{R}$$

and simplying we have $$\frac{B \cdot .01745\, r}{r+2R}=\tan Og-\tan x.$$

Adding $\tan x$ to both sides of the equation we have $$\frac{B \cdot .01745\, r}{r+2r}+\tan x=\tan Og.$$

Substituting value of B which equals $$\frac{\tan x}{.01745}$$

and factoring we have $$\tan Og=\left(\frac{r}{r+2R}+1\right)\tan x.$$

In a similar manner, using fundamental equation (4) and the critical value of the arc of recession, it may be proved that $$\tan Op=\left(\frac{R}{R+2r}+1\right)\tan x.$$

Making the fundamental equation (1) equal its critical value and solving for $a$ we have the following $$\sqrt{\frac{(R+A)^2-R^2\cos^2 x}{R\cos x}}=\left(\frac{r}{r+2R}+1\right)\tan x.$$

Multiplying both sides of the equation by R cos $x$, we have $$\sqrt{(R+A)^2 - R^2 \cos^2 x} = \left(\frac{r}{r+2R} + 1\right) R \sin x.$$

Squaring both sides and adding $R^2 \cos x^2$ we have $$(R+A)^2 = \left(\frac{r}{r+2R} + 1\right)^2 R^2 \sin x^2 + R^2 \cos^2 x.$$

Extracting the square root of both sides and subtracting R we have $$A = \sqrt{\left(\frac{r}{r+2R} + 1\right)^2 R^2 \sin x^2 + R^2 \cos^2 x} - R$$

Factoring this quantity in surd we have $$A = \left\{\left(\sqrt{\left(\frac{r}{r+2R} + 1\right)^2 + \cot^2 x}\right) \sin x - 1\right\} R$$

In a similar manner, by making the fundamental equation (2) equal its critical value we may prove that $$a = \left\{\left(\sqrt{\left(\frac{R}{R+2r} + 1\right)^2 + \cot x^2}\right) \sin x - 1\right\} r$$

All of the factors entering into the above formulæ are fixed factors for any particular set of gears being considered, and consequently the correct form of the teeth can be absolutely determined for each size of intermeshing gears. These formulæ hold for both spur, helical and beveled gears. When spur or helical gears are considered $r$ is taken as the pitch radius of the smaller gear or pinion and R as the pitch radius of the larger gear, whereas when beveled gears are considered $r$ is taken as the back cone radius of the smaller gear or pinion and R as the back cone radius of the larger gear. In the case of beveled gears the form of the tooth, strictly speaking, is octoidal, but nevertheless follows the formulæ given.

Gear teeth having the shape of this invention differ from the ordinary involute teeth primarily as to the length and curvature of the addenda. In general, the addenda of the new form of teeth are shorter and the teeth as a whole are stubbier than is the case with the standard involute gears. A comparison of the new form of tooth for some assumed gear pair with the form of tooth of a similar gear pair as formed by prior methods is illustrated in Fig. 5, where the unbroken lines indicate the form of the new tooth and the broken lines the form of the standard involute tooth. In this view the pitch circles of the two gears are made to coincide, being indicated at $p$. $b$ indicates the base circle of the new gear, $b\ s$ the base circle of the standard involute tooth gear, and the lines $t$ and $t'$ the tangents to the base circles of the two gears. It will be apparent that the new form of tooth is stubbier than the old form and that it is not cleared away below the pitch circle, so that the addendum of the mating tooth, during the tooth action, has a rolling action on this portion of the tooth; whereas with the standard form of involute tooth gearing, the tooth action at this point is purely a sliding one. It is therefore apparent that with the new form of tooth the amount of sliding movement is less than in the standard form of tooth, and that the sliding movement in of tooth, and that the sliding movements in as a consequence of which gears with this form of tooth possess the several advantages hereinbefore described.

The form of tooth described is applicable to any type of spur, helical or beveled gearing and while the tooth form is dependent upon the relative sizes of the intermeshing gears and the angular velocity ratio thereof, yet in all cases it is fixed by the constants hereinbefore specified and is capable of being exactly produced.

It will be understood that under certain conditions it may be advisable to use values of the various variable factors other than those mentioned in the detailed description, in which case the gearing would not have all of the advantages of the theoretical correct gearing, but nevertheless would not depart from the substance of the invention.

What I claim is:—

1. A pair of intermeshing toothed gears of the character specified having teeth of the character specified, said teeth being of such shape that the ratio of the increment of the rolling length of curve to the increment of the sliding length of curve is substantially the same at the beginning of the approach and at the end of the recession.

2. A pair of intermeshing toothed gears characterized by teeth so shaped that the addenda of the teeth of the smaller gear or pinion are equal to $$\left\{\left(\sqrt{\left(\frac{R}{R+2r} + 1\right)^2 + \cot^2 x}\right) \sin x - 1\right\} r,$$

and the addenda of the teeth of the larger gear are equal to $$\left\{\left(\sqrt{\left(\frac{r}{r+2R} + 1\right)^2 + \cot^2 x}\right) \sin x - 1\right\} R,$$

in which $r$ and R are, respectively, in the case of spur or helical gears, the pitch radii of the smaller and larger gears, and in the case of beveled gears, the back cone radii of the larger and smaller gears, and $x$ is the pressure angle.

In testimony whereof, I have hereunto set my hand.

JOSEPH C. O'BRIEN.

Witness:
GLENN H. LERESCHE.

Certificate of Correction.

It is hereby certified that in Letters Patent No. 1,412,889, granted April 18, 1922, upon the application of Joseph C. O'Brien, of Pittsburgh, Pennsylvania, for an improvement in "Involute-Toothed Gears," errors appear in the printed specification requiring correction as follows: Page 2, lines 72 and 73, for the equation $$(1) \quad \text{Tan } Og = \sqrt{\frac{(R+A)^2 - R^2 \cos^2 x}{R \cos x}}$$

read $$(1) \quad \text{Tan } Og = \frac{\sqrt{(R+A)^2 - R^2 \cos^2 x}}{R \cos x}$$

and lines 75 and 76, for the equation $$(2) \quad \text{Tan } Op = \sqrt{\frac{(r+a)^2 - r^2 \cos^2 x}{r \cos x}}$$

read $$(2) \quad \text{Tan } Op = \frac{\sqrt{(r+a)^2 - r^2 \cos^2 x}}{r \cos x}$$

page 5, line 75, for the word "movement" read *movements;* same page, strike out present line 76 and insert the words and comma *the approach and in the recession are equal,* ; and that the said Letters Patent should be read with these corrections therein that the same may conform to the record of the case in the Patent Office.

Signed and sealed this 6th day of June, A. D., 1922.

[SEAL.]                   WM. A. KINNAN,
*Acting Commissioner of Patents.*